United States Patent
Graban et al.

(10) Patent No.: US 8,563,154 B2
(45) Date of Patent: Oct. 22, 2013

(54) BATTERY ASSEMBLY WITH IMMERSED CELL TEMPERATURE REGULATING

(75) Inventors: Robert Graban, Livonia, MI (US); Keith E. Newman, Athens, PA (US); Alastair Gordon Anderson, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 577 days.

(21) Appl. No.: 12/436,586

(22) Filed: May 6, 2009

(65) Prior Publication Data

US 2010/0285346 A1    Nov. 11, 2010

(51) Int. Cl.
*H01M 10/50* (2006.01)
*H01M 2/00* (2006.01)
*H01M 2/02* (2006.01)
*H01M 2/04* (2006.01)

(52) U.S. Cl.
USPC ............ 429/120; 429/148; 429/167; 429/176

(58) Field of Classification Search
USPC .................................................. 429/121–347
See application file for complete search history.

(56) References Cited

U.S. PATENT DOCUMENTS

| | | | |
|---|---|---|---|
| 5,569,552 A * | 10/1996 | Rao et al. ......................... | 429/72 |
| 6,586,132 B1 * | 7/2003 | Fukuda et al. ................ | 429/120 |
| 2003/0064283 A1 * | 4/2003 | Uemoto et al. ............... | 429/149 |
| 2005/0255379 A1 * | 11/2005 | Marchio et al. ............... | 429/153 |

OTHER PUBLICATIONS

CPO, Chinese Office Action, for Chinese Patent Application No. 201010173970.3, mailed Feb. 21, 2013.

* cited by examiner

*Primary Examiner* — Basia Ridley
*Assistant Examiner* — James Lee
(74) *Attorney, Agent, or Firm* — Ingrassia Fisher & Lorenz, P.C.

(57) ABSTRACT

A battery assembly includes a casing with a casing wall having inner and outer surfaces and an opening therethrough and being shaped such that a coolant chamber is formed within the casing adjacent to the opening. A sleeve including a compressible material is inserted through the opening. The sleeve is shaped such that a sealing portion thereof is positioned over the outer surface of the casing wall. A battery cell is inserted into the sleeve such that at least a portion of the battery cell is positioned within the coolant chamber. A sealing member is coupled to the casing such that a force is applied onto the sealing portion of the sleeve causing the sealing portion of the sleeve to at least partially compress and seal the coolant chamber.

20 Claims, 4 Drawing Sheets

BATTERY ASSEMBLY WITH IMMERSED CELL TEMPERATURE REGULATING

TECHNICAL FIELD

The present invention generally relates to battery assemblies, and more particularly relates to a battery assembly with an immersed cell cooling system.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel vehicles that utilize voltage supplies, such as hybrid and battery electric vehicles. Such alternative fuel vehicles typically use one or more electric motors, often powered by batteries, perhaps in combination with another actuator, to drive the wheels.

In order to optimize battery performance, it is important to properly regulate the temperature (both cooling and heating) of the battery cells in the batteries used in, for example, hybrid and battery electric vehicles. Conventional temperature regulation systems utilize cooling channels formed in machined or stamped components that are placed adjacent to the cells. However, such systems often limit the surface area of the cells that are effectively cooled or heated. Additionally, because of the relatively high number of parts, such as seals, that are used to properly assemble the systems, manufacturing and maintenance costs are undesirably high.

Accordingly, it is desirable to provide a system and method for regulating battery cell temperature with improved performance. Additionally, it is desirable to provide a system and method for battery cell temperature regulation that reduces the required number of parts, as well as manufacturing and maintenance costs. Furthermore, other desirable features and characteristics of the present invention will become apparent from the subsequent description taken in conjunction with the accompanying drawings and the foregoing technical field and background.

SUMMARY OF THE INVENTION

In one embodiment, a battery assembly is provided. The battery assembly includes a casing with a casing wall having inner and outer surfaces and an opening therethrough and being shaped such that a coolant chamber is formed within the casing adjacent to the opening, a sleeve including a compressible material inserted through the opening, the sleeve being shaped such that a sealing portion thereof is positioned over the outer surface of the casing wall, a battery cell inserted into the sleeve such that at least a portion of the battery cell is positioned within the coolant chamber, and a sealing member coupled to the casing such that the sealing member applies a force onto the sealing portion of the sleeve causing the sealing portion of the sleeve to at least partially compress and seal the coolant chamber.

In another embodiment, a battery assembly is provided. The battery assembly includes a casing with a casing wall having inner and outer surfaces and a plurality of openings therethrough and being shaped such that a coolant chamber is formed within the casing adjacent to the plurality of openings, a plurality of sleeves, each including a compressible material and being inserted through one of the plurality of openings, the sleeves being shaped such that a sealing portion thereof is positioned over the outer surface of the casing wall, a plurality of battery cells, each battery cell being inserted into one of the plurality of sleeves such that at least a portion thereof is positioned within the coolant chamber, and at least one sealing member coupled to the casing such that a force is applied onto the sealing portion of each of the plurality of sleeves causing the sealing portion of each of the sleeves to at least partially compress and seal the coolant chamber.

In a further embodiment, an automotive battery assembly is provided. The automotive battery assembly includes a casing with a casing wall being shaped such that a coolant chamber is formed within the casing and having inner and outer surfaces, a plurality of slots therethough adjacent to the coolant chamber, and first and second coolant ports in fluid communication with the coolant chamber, a plurality of sleeves, each including a compressible rubber material and being inserted through a respective one of the slots, the sleeves being shaped such that a sealing portion of each sleeve is positioned over the outer surface of the casing wall and the sealing portion of at least some of the sleeves is adjacent to the sealing portion of another sleeve, a plurality of battery cells, each battery cell being inserted into a respective one of the sleeves such that at least a lower portion thereof is positioned within the coolant chamber and an upper portion thereof extends out of the coolant chamber, each of the battery cells comprising first and second terminals coupled to the upper portion thereof, and at least one sealing member coupled to the casing such that a force is applied onto the sealing portion of each of the plurality of sleeves causing the sealing portion of each of the sleeves to at least partially compress and seal the coolant chamber.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-5 are merely illustrative and may not be drawn to scale.

FIG. 1 to FIG. 5 illustrate a battery assembly according to one embodiment of the present invention. The battery assembly includes a casing with a casing wall having inner and outer surfaces and an opening therethrough and being shaped such that a coolant chamber is formed within the casing adjacent to the opening. A sleeve including a compressible material is inserted through the opening. The sleeve is shaped such that a sealing portion thereof is positioned over the outer surface of the casing wall. A battery cell is inserted into the sleeve such that at least a portion of the battery cell is positioned within the coolant chamber. A sealing member is coupled to the casing such that a force is applied onto the sealing portion of the sleeve causing the sealing portion of the sleeve to at least partially compress and seal the coolant chamber.

Figure 1:
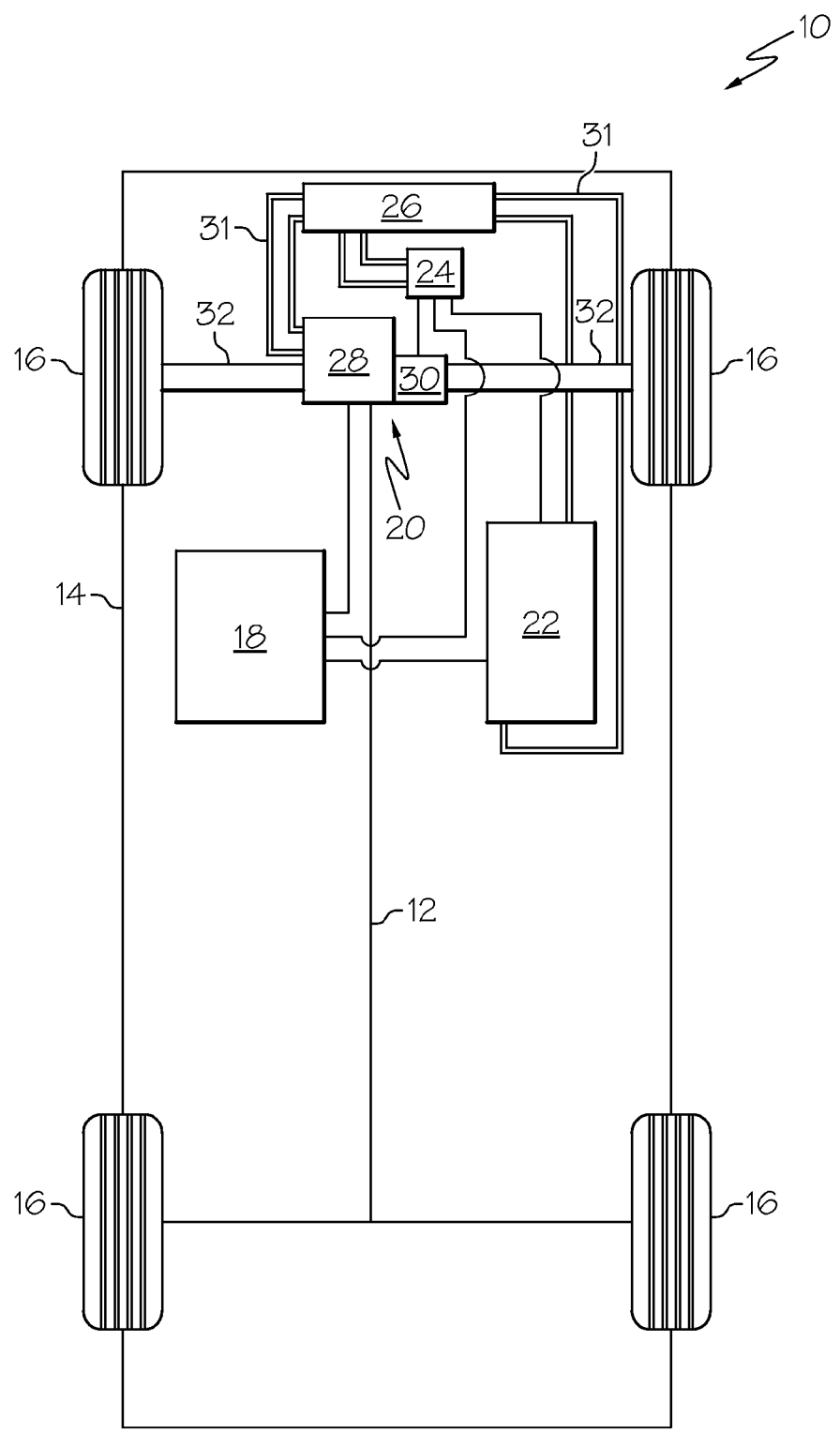
FIG. 1 is a schematic view of an exemplary automobile according to one embodiment of the present invention.

FIG. 1 illustrates a vehicle (or "automobile") 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor (e.g., battery and/or fuel cell powered).

In the exemplary embodiment illustrated in FIG. 1, the automobile 10 is an HEV, and further includes an actuator assembly 20, a battery system (or a high voltage direct current (DC) power supply) 22, a power converter assembly (e.g., an inverter or inverter assembly) 24, and a heat exchanger 26. The actuator assembly 20 includes a combustion engine 28 and an electric motor/generator (or motor) 30.

Still referring to FIG. 1, the combustion engine 28 and/or the electric motor 30 are integrated such that one or both are mechanically coupled to at least some of the wheels 16 through one or more drive shafts 32. In one embodiment, the automobile 10 is a "series HEV," in which the combustion engine 28 is not directly coupled to the transmission, but coupled to a generator (not shown), which is used to power the electric motor 30. In another embodiment, the automobile 10 is a "parallel HEV," in which the combustion engine 28 is directly coupled to the transmission by, for example, having the rotor of the electric motor 30 rotationally coupled to the drive shaft of the combustion engine 28.

The heat exchanger (e.g. a radiator and/or coolant sump) 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the actuator assembly 20, the battery system 22, and the inverter 24 though fluid conduits 31. It should be understood that the heat exchanger 26 may be used to both cool and heat the various components to which it is coupled.

Referring again to FIG. 1, in the depicted embodiment, the inverter 24 receives and shares coolant with the electric motor 30 and the battery system 22. However, other embodiments may use separate coolants for the battery system 22, the inverter 24, and the electric motor 30.

The electronic control system 18 is in operable communication with the actuator assembly 20, the battery 22 system, and the inverter assembly 24. Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Although not shown in detail, the electric motor 30, in one embodiment, includes a stator assembly (including conductive coils or windings) and a rotor assembly (including a ferromagnetic core and/or magnets), as well as a transmission. The stator assembly and/or the rotor assembly within the electric motor 30 may include multiple electromagnetic poles (e.g., sixteen poles), as is commonly understood.

The inverter 24 may include a three-phase circuit coupled to the motor 30. More specifically, the inverter 24 may include a switch network having a first input coupled to the battery system 22 (i.e., a voltage source ($V_{dc}$)) and an output coupled to the motor 30. The switch network may include three pairs (a, b, and c) of series switches (e.g., insulated gate bipolar transistors (IGBTs) within integrated circuits formed on semiconductor substrates) with antiparallel diodes (i.e., antiparallel to each switch) corresponding to each of the phases of the motor 30

FIGS. 2-5 illustrate a battery assembly 34, according to one embodiment the present invention. The battery assembly 34 may be implemented as the battery system 22, or a portion of the battery system 22, in FIG. 1. That is, although only one battery assembly 34 is shown, it should be understood that the battery system 22 may include multiple battery assemblies 34 (e.g., between 5 and 10). The battery assembly 34 includes a casing 36, a plurality of battery cell sleeves 38, a plurality of battery cells 40, and a lid 42.

The casing 36 is substantially formed from a casing wall 44 that is, in the depicted embodiment, rectangular. The casing wall 44 is made of, for example, a composite material or a metal, such as aluminum, and encloses a coolant chamber 46 that may have a shape similar to that of the casing wall 44. The casing 36 may have, for example, a length 48 of between 10 and 25 inches, a width 50 of between 5 and 12 inches, and a height 52 of between 4 and 10 inches. The casing wall 44 (and/or the casing 36) also includes a top piece (or portion) 54, a bottom piece 56, and side pieces 58.

Figure 3:
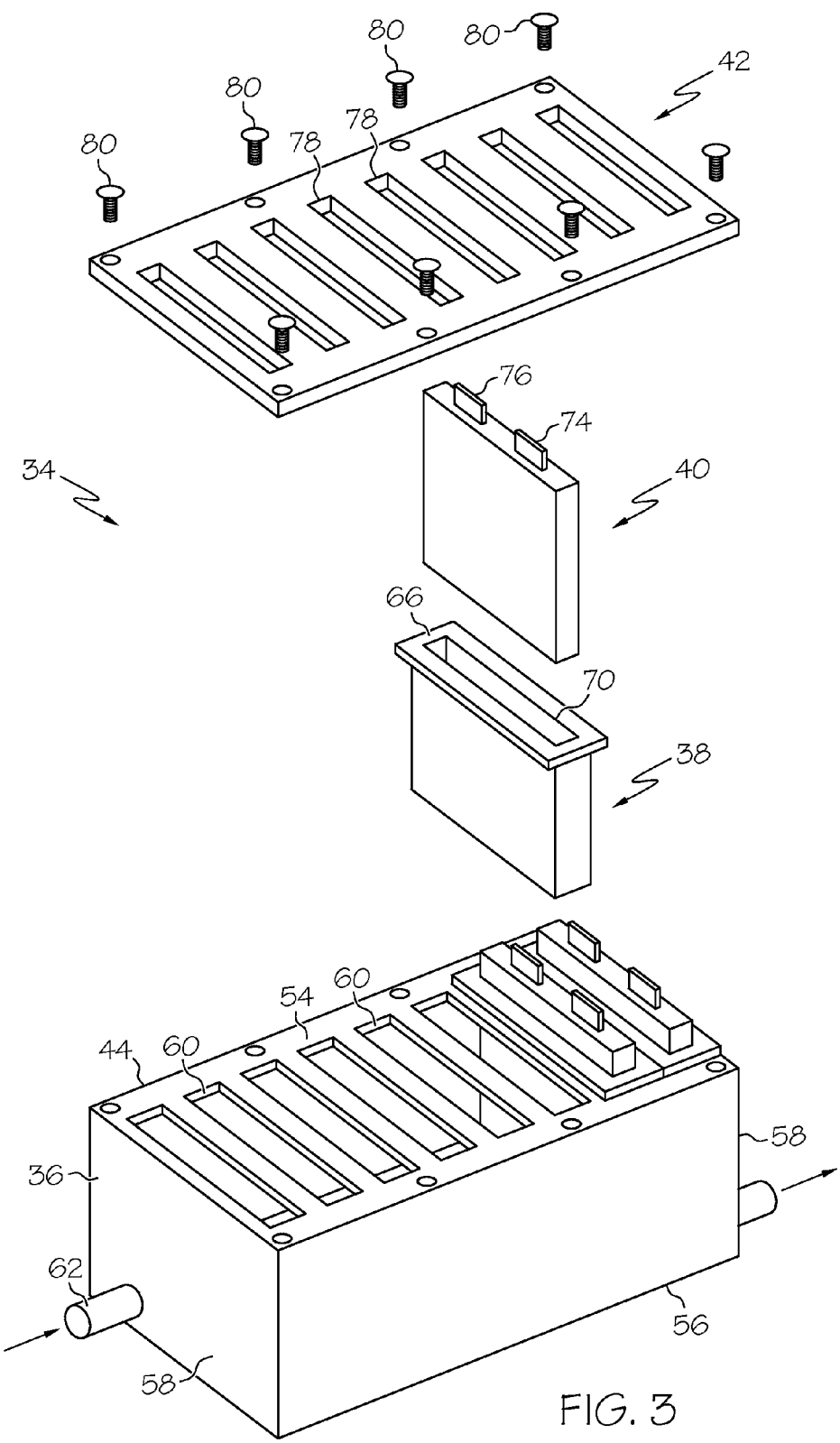
FIG. 3 is an exploded isometric view of the battery assembly of FIG. 2.

As shown most clearly in FIG. 3, the top piece 54 has a plurality of battery cell slots (or openings) 60 formed in, or through, the top piece 54 and adjacent to the coolant chamber 46. As is apparent in the illustrated example, the slots 60 have lengths that substantially extend the entire width 50 of the casing 36. The casing 36 also includes an inlet (or first) port 62 and an outlet (or second port) 64 extending through the side pieces 58 of the casing wall 44, which are in fluid communication with the coolant chamber 46, as well as the fluid conduits 31 that interconnect the battery system 22 and the heat exchanger 26 (FIG. 1).

Figure 4:
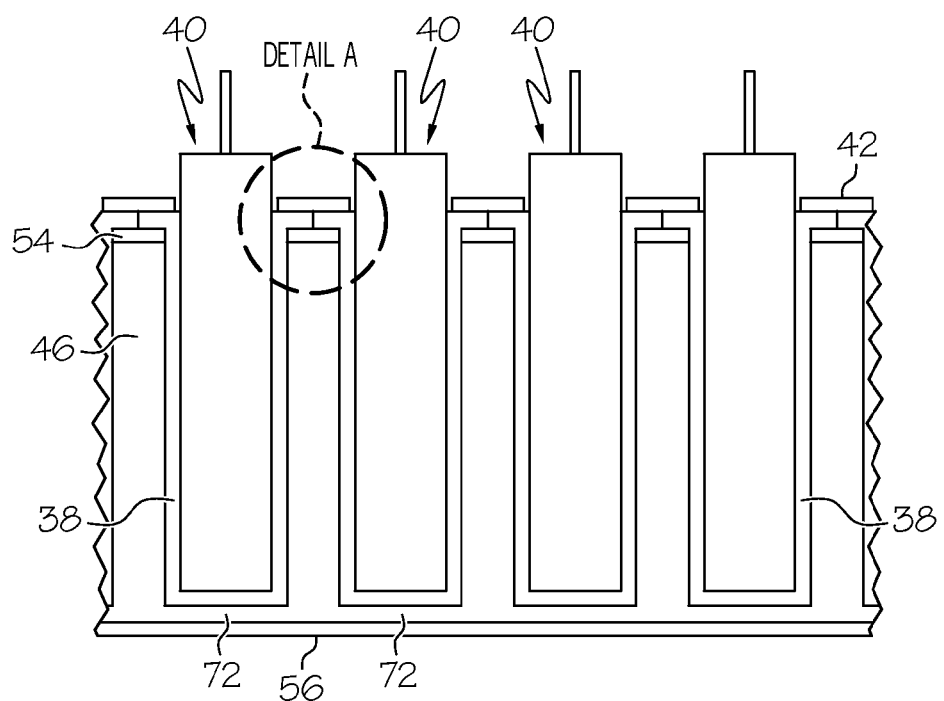
FIG. 4 is a cross-sectional side view of the battery assembly of FIG. 2 taken along line 4-4.
Figure 5:
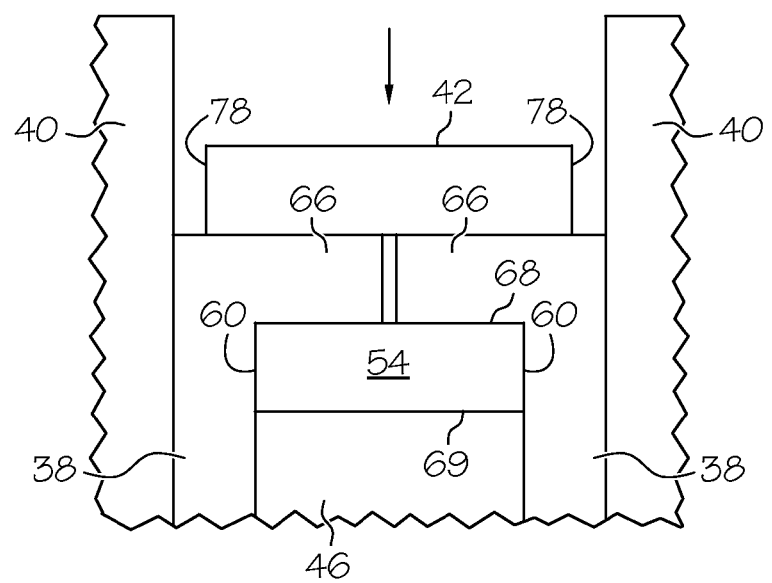
FIG. 5 is a cross-sectional side view of Detail A of the battery assembly of FIG. 4.

Still referring to FIG. 3, each of the sleeves 38 is, in the depicted embodiment, inserted into a respective one of the slots 60. The sleeves 38 have a length extending in direction similar to that of the slots 60. The sleeves include a lip, or sealing portion, 66 extending from an upper portion thereof. A width of the sleeves 38 is similar to that of the slots 60 such that the lip 66 catches on an outer surface 68 of the casing wall 44 and surrounds, or circumscribes, a periphery of the slot 60 into which it is inserted. The sleeves 38 are made of a compressible material, such as a rubber or silicone material, shaped such that a battery cell cavity 70 is formed therein. The material used to form the sleeves 38 may have a thickness of less than 2 millimeters (mm), such as approximately 1 mm, and be impermeable to the coolant(s) used in the heat exchanger 26 (FIG. 1). As shown in FIGS. 4 and 5, the lips 66 of the sleeves 38 are sized (and/or the slots 60 are arranged) such that the lip 66 of each sleeve 38 is adjacent to, or nearly in contact with, the lip 66 of another sleeve 38.

In the embodiment shown in FIG. 4, the sleeves 38 are sized such that when the lips 66 are in contact with the outer surface 68 of the casing wall 44, gaps 72 are formed between the portions of the sleeves 38 that extend past an inner surface 69 of the casing wall 44 and the bottom piece 56 of the casing wall 44.

Although in the embodiment shown, the sleeves 38 are shown as separate components, it should be understood that in other embodiments, the sleeves may be connected (or interconnected) at the lips of adjacent sleeves. In such a way, the sleeves may essentially be a single integral component, with a plurality of battery cell cavities (similar to battery cell cavities 70) formed therein.

The battery cells 40 are, in one embodiment, prismatic lithium ion battery cells, as are commonly understood. Each of the battery cells 40 is inserted into a respective one of the sleeves 38, and thus the slot 60 associated with the sleeve 38. Still referring to FIG. 4, the battery cells 40 have lengths and widths that are substantially identical to those of the battery cell cavity 70 so that lower portions of the battery cells 40 are frictionally fit into the battery cell cavity 70. That is, each side of the battery cells 40 is in contact with the respective sleeve 38. The battery cells 40 also include first and second (e.g., positive and negative) terminals 74 and 76 extending from an upper portion thereof, which extends from the coolant chamber 46 and the battery cell cavity 70 of the respective sleeve 38. That is, the battery cells 40 have a height that is greater than the height (or depth) of the sleeves 38.

The lid, or sealing member, 42 is substantially planar and has the same size and shape as the top piece 54 of the casing wall 44. The lid 42 likewise includes a series of openings 78, each of which corresponds to one of the slots 60, and may be made of the same material as the casing wall 44. In the embodiment depicted in FIG. 3, the lid 42 is secured to the casing 36 by a plurality of fasteners 80, such as screws or bolts.

Referring to FIGS. 4 and 5, when the lid 42 is secured to the casing wall 44, the upper portion of each of the battery cells 40 extends through a respective one of the openings 78. The various portions of the lid 42 apply a force onto the lips 66 of the sleeves 38, causing the lips 66 to at least partially compress and thus form a seal around each of the slots 60 in the top piece 54 of the casing wall 44. As is apparent in FIG. 4 (but not FIG. 2), a gap may be formed between the casing wall 44 and the lid 42 by the lips 66 of the sleeves 38 regardless of the compression of the lips 66 of the sleeves 38.

Although not shown, it should be understood that the battery cells 40 may be electrically connected, in series or in parallel, via the terminals 74 and 76 and coupled to the electric motor 30, as well as other components, as is commonly understood.

During operation, referring to FIG. 1, the automobile 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery system 22 to the inverter 24, which converts the DC power into alternating current (AC) power, before the power is sent to the electric motor 30. As will be appreciated by one skilled in the art, the conversion of DC power to AC power is substantially performed by operating (i.e., repeatedly switching) the transistors within the inverter 24 at a "switching frequency" ($F_{sw}$), such as, for example, 12 kilohertz (kHz). In one embodiment, the electronic control system 18, or a subsystem thereof, produces a Pulse Width Modulation (PWM) signal for controlling the switching action of the inverter 24. The inverter 24 then converts the PWM signal to a modulated voltage waveform for operating the motor 30.

Figure 2:
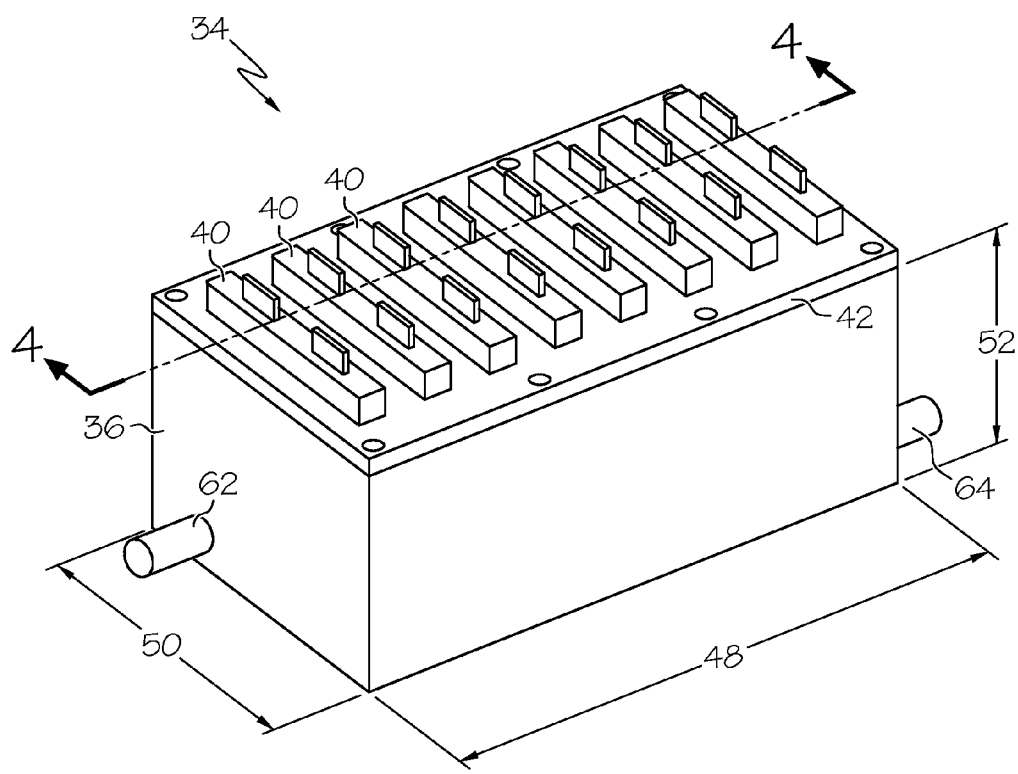
FIG. 2 is a isometric view of a battery assembly according to one embodiment of the present invention.

In order to regulate the temperature of the battery cells 40, coolant (and/or anti-freeze) is provided to the battery system 22 from the heat exchanger 26 (FIG. 1). Referring to FIGS. 2 and 4, the coolant flows into the coolant chamber 46 through the inlet port 62 on the casing 36. As the coolant passes through the coolant chamber 46, the coolant surrounds the portions of the sleeves 38 that extend into the coolant chamber 46 and thus the lower portions of the battery cells 40. As the coolant moves across the sleeves, the coolant removes (or supplies) heat from (or to) the battery cells 40. In the depicted embodiment, this exchange of heat also occurs between the bottom piece 56 of the casing wall 44 and the battery cells 40.

It should be noted that due to the impermeable material used in the sleeves 38, the coolant does not directly contact the battery cells 40. Rather, the exchange of heat takes place through the sleeves 38. Further, the combination of the impermeable material and the compressed caused by the lid 42 seals the slots 60 in the top piece 54 of the casing wall 44 thereby preventing the coolant from leaking from the casing 36.

One advantage of the battery assembly described above is that because the coolant is free to completely surround the portions of the battery cells within the coolant chamber, the exchange of heat between the battery cells and the coolant is increased. As a result, temperature regulation, as well as battery performance, is improved. Another advantage is that because of the use of the sleeves and the lid, the battery assembly is simplified, as the number of parts used to seal the coolant chamber is reduced. As a result, manufacturing costs are reduced and maintenance is facilitated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A battery assembly comprising;
a casing comprising a casing wall having inner and outer surfaces and a first opening therethrough and being shaped such that a coolant chamber is formed within the casing adjacent to the first opening;
a sleeve comprising a compressible material inserted through the first opening, the sleeve being shaped such that a sealing portion thereof is positioned over the outer surface of the casing wall;
a battery cell inserted into the sleeve such that at least a portion of the battery cell is positioned within the coolant chamber such that at least a portion of the coolant chamber extends between adjacent battery cells and such that a top portion of the battery cell extends out of the first opening; and
a sealing member coupled to the casing such that the sealing member applies a force onto the sealing portion of the sleeve causing the sealing portion of the sleeve to at least partially compress and seal the coolant chamber, the sealing member defining a second opening generally aligned with the first opening such that, when the sealing member seals the coolant chamber, the top portion of the battery cell extends out of the second opening,
wherein the sealing member has a lower surface pressing against the sealing portion of the sleeve and an upper surface opposite the lower surface such that the second opening extends between the lower surface and the upper surface, and
wherein the top portion of the battery extends out of the second opening, above the upper surface of the sealing member.

2. The battery assembly of claim 1, wherein the sleeve is shaped such that the sealing portion of the sleeve is on opposing sides of the first opening through the casing wall, and wherein the sealing member is a lid for the casing that seals the coolant chamber between the adjacent battery cells and at a position below the top portion of the battery cell.

3. The battery assembly of claim 2, wherein the sleeve is shaped such that the sealing portion of the sleeve surrounds a periphery of the first opening through the casing wall, and wherein the battery assembly further comprises fasteners configured to secure the sealing member to the casing and to provide a compressive force that seals the coolant chamber.

4. The battery assembly of claim 3, wherein the sleeve comprises a battery cell cavity having a length and a width substantially identical to a length and width of the battery cell.

5. The battery assembly of claim 4, wherein the sleeve has a height that is less than a height of the battery cell.

6. The battery assembly of claim 5, wherein the casing wall comprises a top portion and a bottom portion and wherein the first opening is through the top portion of the casing wall.

7. The battery assembly of claim 6, wherein the sleeve is sized such that when the sleeve is inserted into the first opening, a gap is formed between a bottom of the sleeve and the bottom portion of the casing wall.

8. The battery assembly of claim 7, wherein the battery cell comprises an upper portion extending from the coolant chamber and first and second terminals connected to the upper portion thereof.

9. The battery assembly of claim 8, wherein the sleeve is made of a rubber material.

10. The battery assembly of claim 9, wherein the battery cell is a prismatic battery cell.

11. A battery assembly comprising;
a casing comprising a casing wall having inner and outer surfaces and a plurality of first openings therethrough and being shaped such that a coolant chamber is formed within the casing adjacent to the plurality of openings;
a plurality of sleeves, each comprising a compressible material and being inserted through one of the plurality of openings, the sleeves being shaped such that a sealing portion thereof is positioned over the outer surface of the casing wall;
a plurality of battery cells, each battery cell being inserted into one of the plurality of sleeves such that at least a first portion thereof is positioned within the coolant chamber and at least a second portion thereof extends out of the respective sleeve through the respective first opening, wherein at least a portion of the coolant chamber extends between adjacent battery cells; and
at least one sealing member coupled to the casing with a securement such that a force is applied onto the sealing portion of each of the plurality of sleeves causing the sealing portion of each of the sleeves to at least partially compress and seal the coolant chamber between the adjacent battery cells, wherein the securement includes at least one of a bolt or a screw, wherein each sealing member has a lower surface pressing against the sealing portion of the respective sleeve and an upper surface opposite the lower surface such that a second opening extends between the lower surface and the upper surface, and wherein the second portion of the battery extends out of the respective second opening, above the upper surface of the sealing member.

12. The battery assembly of claim 11, wherein the casing wall further comprises first and second coolant ports extending therethrough and in fluid communication with the coolant chamber.

13. The battery assembly of claim 12, wherein each of the plurality of sleeves is inserted into a respective one of the plurality of first openings through the casing wall, and each of the plurality of battery cells is inserted into a respective one of the sleeves.

14. The battery assembly of claim 13, wherein the plurality of openings through the casing wall and the sleeves are sized and shaped such that the sealing portion of each of the plurality of sleeves is adjacent to the sealing portion of another sleeve.

15. The battery assembly of claim 11, wherein the plurality of sleeves are interconnected.

16. An automotive battery assembly comprising;
a casing comprising a casing wall being shaped such that a coolant chamber is formed within the casing and having inner and outer surfaces, a plurality of slots therethough adjacent to the coolant chamber, and first and second coolant ports in fluid communication with the coolant chamber;
a plurality of sleeves, each comprising a compressible rubber material and being inserted through a respective one of the slots, the sleeves being shaped such that a sealing portion of each sleeve is positioned over the outer surface of the casing wall and the sealing portion of at least some of the sleeves is adjacent to the sealing portion of another sleeve;
a plurality of battery cells, each battery cell being inserted into a respective one of the sleeves such that at least a portion of the coolant chamber extends between adjacent battery cells and such that at least a lower portion thereof is positioned within the coolant chamber and an upper portion thereof extends out of the coolant chamber, each of the battery cells comprising first and second terminals coupled to the upper portion thereof;

at least one sealing member coupled to the casing such that a force is applied onto the sealing portion of each of the plurality of sleeves causing the sealing portion of each of the sleeves to at least partially compress and seal the coolant chamber between the adjacent battery cells, wherein the at least one sealing member includes a plurality of openings arranged such that the upper portions of the plurality of battery cells extend through the plurality of openings, and wherein the sealing portion of each of the plurality of sleeves is positioned below the top portions of the plurality of battery cells; and a securement comprising at least one of a bolt or screw configured to secure the at least one sealing member to the casing and to provide the force to the sealing portion via the sealing member, wherein each sealing member has a lower surface pressing against the sealing portion of each sleeve and an upper surface opposite the lower surface such that the plurality of openings extend between the lower surface and the upper surface, and wherein the upper portions of the plurality of battery cells extend out of the plurality of openings, above the upper surface of the sealing member.

17. The automotive battery assembly of claim 16, wherein each of the plurality of sleeves is shaped such that the sealing portion thereof surrounds a periphery of the respective slot through the casing wall.

18. The automotive battery assembly of claim 17, wherein each of the plurality of sleeves comprises a battery cell cavity having a length and a width substantially identical to a length and a width of the respective battery cell.

19. The automotive battery assembly of claim 18, wherein the casing wall further comprises a top portion and a bottom portion, each of the slots extending through the top portion of the casing wall, and each of the plurality of sleeves is sized such that a gap is formed between a bottom of the sleeve and the bottom portion of the casing wall when the sleeve is inserted into the respective slot.

20. The automotive battery assembly of claim 19, wherein the plurality of battery cells are prismatic lithium ion battery cells.

* * * * *